United States Patent
Rangarajan et al.

(10) Patent No.: US 8,578,579 B2
(45) Date of Patent: Nov. 12, 2013

(54) SYSTEM AND METHOD FOR ADAPTIVE MACHINING

(75) Inventors: Arvind Rangarajan, Rexford, NY (US); Michael Evans Graham, Slingerlands, NY (US); Michelle René Bezdecny, Niskayuna, NY (US); Timothy Mark Heitzman, Maineville, OH (US)

(73) Assignee: General Electric Company, Niskayuna, NY (US)

( * ) Notice: Subject to any disclaimer, the term of this patent is extended or adjusted under 35 U.S.C. 154(b) by 914 days.

(21) Appl. No.: 11/954,178

(22) Filed: Dec. 11, 2007

(65) Prior Publication Data

US 2009/0144980 A1   Jun. 11, 2009

(51) Int. Cl.
*B23P 6/00* (2006.01)

(52) U.S. Cl.
USPC ........................ 29/402.01; 29/889.1

(58) Field of Classification Search
USPC ........................... 29/889.1, 402.01
See application file for complete search history.

(56) References Cited

U.S. PATENT DOCUMENTS

| | | | |
|---|---|---|---|
| 4,883,216 A | 11/1989 | Patsfall | |
| 5,038,014 A | 8/1991 | Pratt et al. | |
| 5,913,555 A | 6/1999 | Richter et al. | |
| 6,238,187 B1 * | 5/2001 | Dulaney et al. | ........... 416/241 R |
| 6,256,546 B1 | 7/2001 | Graham et al. | |
| 6,661,930 B1 | 12/2003 | Graham et al. | |
| 6,912,446 B2 | 6/2005 | Wang et al. | |
| 6,969,826 B2 | 11/2005 | Trewiler et al. | |
| 7,825,348 B2 | 11/2010 | Bouet et al. | |
| 2005/0102835 A1 * | 5/2005 | Trewiler et al. | ............. 29/889.1 |
| 2005/0217110 A1 | 10/2005 | Topal | |
| 2006/0090336 A1 | 5/2006 | Graham et al. | |

FOREIGN PATENT DOCUMENTS

| | | |
|---|---|---|
| CN | 1044777 A | 8/1990 |
| CN | 1680066 A | 10/2005 |
| CN | 1680068 A | 10/2005 |
| CN | 1903494 A | 1/2007 |
| DE | 19963714 A1 | 7/2001 |
| EP | 0837220 A2 | 4/1998 |
| GB | 2401213 A | 11/2004 |
| JP | 01294901 A | 11/1989 |
| JP | 2004001633 A | 1/2004 |
| WO | 9529037 A1 | 11/1995 |

* cited by examiner

*Primary Examiner* — David Bryant
*Assistant Examiner* — Moshe Wilensky
(74) *Attorney, Agent, or Firm* — Jenifer Haeckl

(57) ABSTRACT

A method of repair includes removing a deformed portion of a component to define a native component portion and adding a replacement portion to the native component portion. The replacement portion is adaptively machined based on one or more parameters of the native component portion and based on one or more original design parameters of the component.

5 Claims, 5 Drawing Sheets

SYSTEM AND METHOD FOR ADAPTIVE MACHINING

BACKGROUND

The invention relates generally to machining, and more particularly to a system and method for adaptive machining of components such as airfoils.

In many applications, such as aircraft, various parts are built with a particular shape or contour, for example, for aerodynamics. Through normal service, there arises a need to repair components such as airfoils in aircraft applications, for example. With respect to airfoils, damage to a leading edge of the airfoil is one of the most common problems. The leading edge is subject to foreign object damage or erosion after a period of service time. A significant savings can be realized if the damaged blades can be repaired and returned to service.

Conventionally, the repair has been accomplished by machining away the damaged portion of the airfoils. Welding material was then manually deposited over the areas that had been machined away. The component was then machined by referencing a nominal model geometry in an attempt to reproduce the originally designed dimensions. Then, the component was hand finished, manually machined, in order to put the component in a serviceable condition.

However, there are shortcomings associated with the historical repair method. The method requires leaving a significant amount of material remaining (i.e., stock on) after the machining, which must be removed by a hand finishing process. This is due to the fact that no component, or blade within a component, is exactly at a nominal condition. The manual nature of the hand finishing process increases the cost and processing time of the repair. Finally, the method results in significant scrap.

BRIEF DESCRIPTION

In accordance with one exemplary embodiment of the present technique, a method of repair is disclosed. The method includes removing a deformed portion of a component to define a native component portion and adding a replacement portion to the native component portion. The replacement portion is adaptively machined based on one or more parameters of the native component portion and based on one or more original design parameters of the component.

In accordance with another exemplary embodiment of the present technique, a computer-implemented method is disclosed. The method includes receiving actual measurements of a component having an undesirable portion. The undesirable portion includes a deformation, a damaged portion, an undesirable shape, or a combination thereof. A computer model of the component is transformed based on the actual measurements and an original design intent, a new optimized design, or a combination thereof.

In accordance with another exemplary embodiment of the present technique, a method of operating an adaptive machining system used for machining a component having a native component portion is disclosed. The method includes measuring a first set of points on the native component portion. An initial position of a computer model of the component is determined by rigid body transformation using the first set of points measured on the native component portion to form a transformed computer model. A second set of points is created on the transformed computer model. The second set of points on the transformed computer model corresponds with the first set of points on the native component portion. The transformed computer model is morphed by matching the first set of points with the second set of points.

In accordance with another exemplary embodiment of the present technique, a method of operating an adaptive machining system used for machining a component having a native component portion is disclosed. The method includes creating a set of points in a built-up region of a transformed computer model representative of the native component portion. The method also includes applying a rigid body transformation and morphing to a plurality nominal cutter contact points of a nominal tool path so as to match the nominal cutter contact points with the set of points to form a plurality of deformed cutter contact points; wherein the plurality of deformed cutter contact points form a deformed tool path.

In accordance with another exemplary embodiment of the present technique, a computer program to enable a controller operating an adaptive machining system for machining a component having a native component portion is disclosed. The computer program includes programming instructions stored in a tangible medium that enable the controller to receive actual measurements of a component having an undesirable portion. The undesirable portion includes a deformation, a damaged portion, an undesirable shape, or a combination thereof. The computer program also includes programming instructions stored in a tangible medium that enable the controller to transforming a computer model of the component based on the actual measurements and an original design intent, a new optimized design, or a combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique provide a method for repairing a component, for example, an airfoil. The method includes removing a deformed portion of a component to define a native component portion. A replacement portion is added to the native component portion. The replacement portion is adaptively machined based on one or more parameters of the native component portion and also one or more original design parameters of the component. Other embodiments include a computer-implemented method, a tangible medium including computer-readable or machine-readable code, and a method of operating an adaptive machining system configured to repair a component based on at least in part on an original design intent, an optimum design, or a combination thereof, as well as present measurements (e.g., dimensions) of the component undergoing repair. In one embodiment, the exemplary technique is applicable to a manufactured component having an undesirable shape, e.g. an airfoil with a blunted leading edge.

The exemplary embodiments provide a technique for defining and machining the final shape of a repaired part. The exemplary technique employs a geometric model of the component. This model may be a CAD model or geometry constructed from a library of measurement data. In one embodiment, the model may be a mesh model. The exemplary technique extrapolates information from measured points on the component and computer model to obtain a smooth "as-is" shape of the component. An initial position for the computer model is determined using a rigid body transformation computed using points measured on a surface of the native component portion. This provides an initial preferred location and orientation for shaping the newly added replacement portion. The transformed model geometry is then deformed using a function or process to smoothly blend the native component portion with the replacement portion. Actual tool paths or other processing steps are then derived from either the new geometry, or through the application of the rigid body transformation and the deformation process directly to nominal tool paths or process parameters. The shape attributes for the replaced portion may be easily controlled by the user, allowing optimization and customization of the machining process. Specific embodiments of the present technique are discussed below referring generally to FIGS. 1-6.

Figure 1:
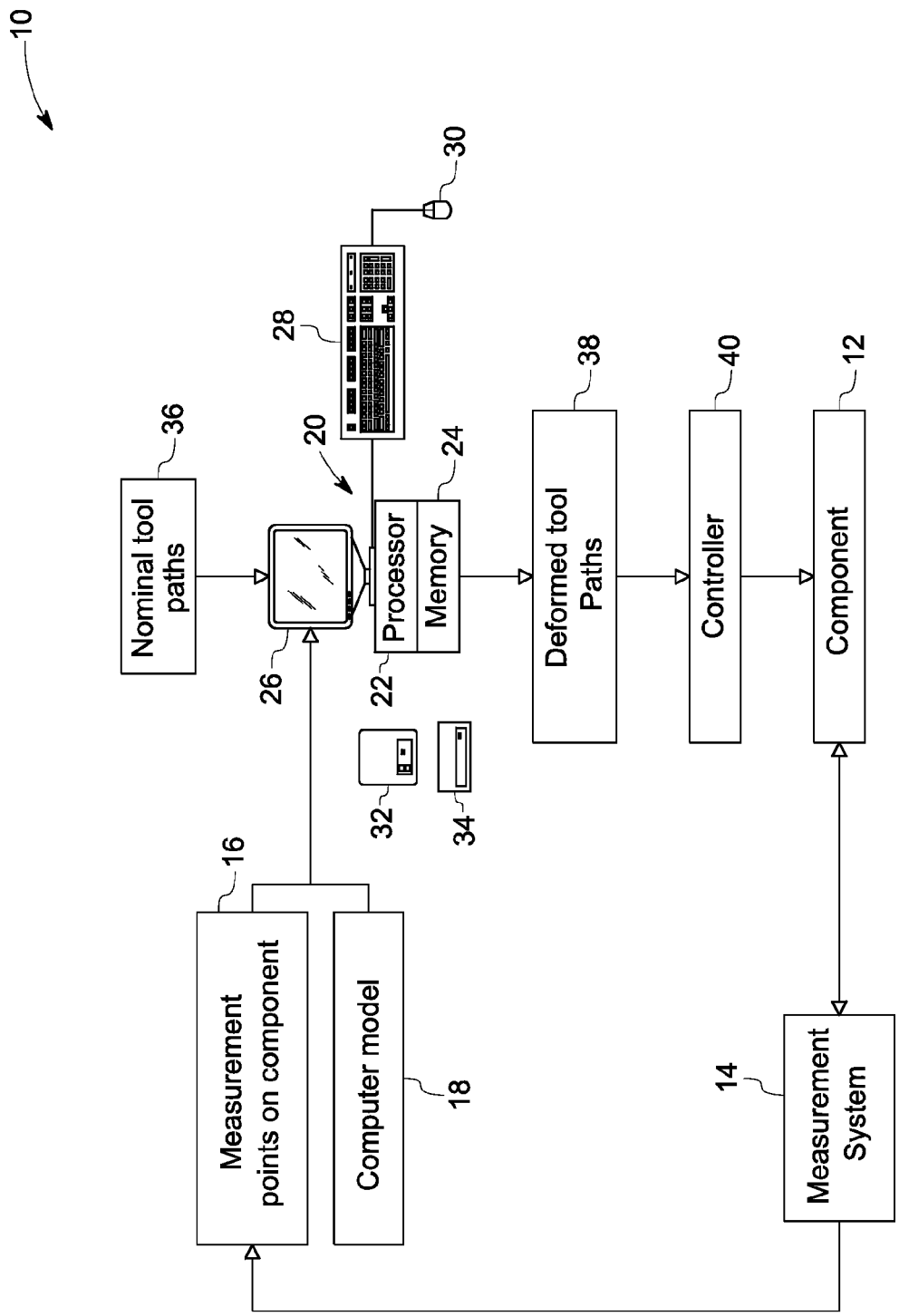
FIG. 1 is a diagrammatical representation of a system for machining a component, for example an airfoil in accordance with an exemplary embodiment of the present technique.

Referring to FIG. 1, an exemplary adaptive machining system 10 used for machining a component 12 such as, for example, an airfoil of an aircraft engine, is illustrated in accordance with certain embodiments of the present technique. The system 10 includes a measurement system 14 configured to provide a first set of measurement points 16 on the component 12 having an undesirable portion. The undesirable portion includes a deformation, a damaged portion, an undesirable shape, or a combination thereof. It should be noted herein that the measurement points 16 are in the "x, y, z" coordinate system and is referred to as the "measured coordinate system". The measurement system 14 may include but not limited to a 5-axis milling machine, coordinate measuring machine (CMM), an x-ray scanning machine, an optical scanning machine, or an ultrasound scanning machine. The system 10 also includes a computer model 18 (e.g., CAD model) of the component. The computer model 18 of the component is representative of the component geometry, shape, appearance, or a combination thereof, after undergoing a particular machining operation. The computer model 18 includes a second set of points in the "X, Y, Z" coordinate system and is referred to as the "computer model coordinate system".

A computer 20 receives the first set of measurement points 16 and the computer model 18. The computer 20 is configured to determine the deviation between the first set of measurement points 16 on the component 12 and the second set of points of the computer model 18. The computer 20 classifies the first set of measurement points 16 on the component as "rigid patch" and "warp patch". Warp patch may be referred to as a region proximate to a repair zone of the component and rigid patch may be referred to as region away from the repair zone of the component. Rigid patch and warp patch are explained in greater detail with reference to subsequent figures below. The computer 20 generates a transformation model that approximates the deformation of the measured component 12 relative to the rigid patch. The computer 20 may be a general purpose computer such as a work station, a personal computer, or a machine controller. The computer 20 includes a processor 22 and a memory 24 including a random access memory (RAM), read only memory (ROM) and/or other components. The computer also includes a monitor 26, a keyboard 28, and a mouse device 30. The computer 20 operates under control of an operating system stored in the memory 24 to present data such as the set of measurement points 16 and the computer model 18 to an operator via the display screen of the monitor 26 and to accept and process commands from the operator via the keyboard 28 and the mouse device 30. The computer 20 generates the transformation model using one or more computer programs or applications (e.g., code or instructions) through a graphical user interface. Set forth below is a more detailed discussion of how the computer 20 generates the transformation model. A computer-readable medium, e.g., one or more removable data storage devices 32 or a fixed data storage device 34, store the operating system, software applications, and other code configured to carry out the embodiments discussed in detail below. The storage devices 32 and 34 may include removable media drives and/or removable storage media, such as floppy discs, compact discs, digital video discs, flash memory, USB pen drives, and so forth. The storage devices 32 and 34 also may include hard disk drives.

The system 10 also includes nominal tool paths 36 for operating a particular tool for machining the component 12. After generating the transformation model, the computer 20 modifies the nominal tool paths 36 to the measured coordinate system of the component 12 according to the transformation model. Set forth below is also a more detailed discussion of how the computer 20 modifies the nominal tool paths 36. The modification of the nominal tool paths 28 results in deformed tool paths 38. A milling controller 40 uses the deformed tool paths 38 to process the component 12 by single pass machining or multi-pass machining.

Figure 2:
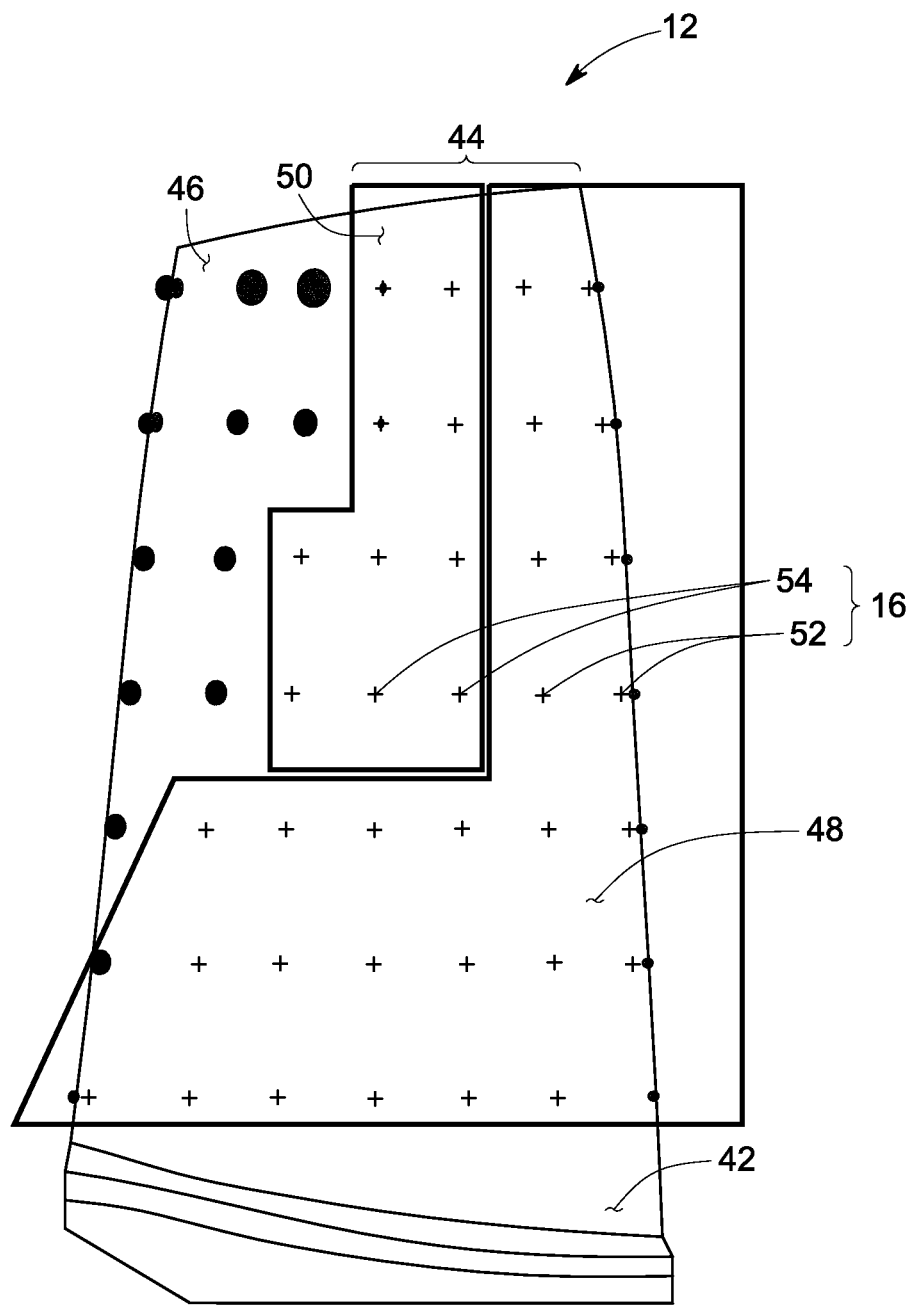
FIG. 2 is a diagrammatical representation of a component surface having a warp patch and rigid patch in accordance with an exemplary embodiment of the present technique.

Referring to FIG. 2, this figure is a diagrammatical representation of a component surface 42 of the component 12 having a native portion 44 and a built-up portion 46 in accordance with an exemplary embodiment of the present technique. In the illustrated embodiment, the component 12 is an airfoil. The airfoil is used only for illustration of the disclosed embodiments, which are not limited to any particular type of component or application. The exemplary technique is equally applicable for repair applications of other suitable components.

Repairing service parts (such as airfoils) often includes removing damaged sections of the part to produce a "native" part, and then replacing the damaged sections with either weld build-up or some other metallic substitute that may be machined away to produce a repaired part by smoothly blending the native part with the built-up part. Smooth blending of the repaired part includes accounting for rigid body errors in the original native part's shape or position, change in part geometry due to service, and any local warping induced by heating the native material during build up processes. The exemplary embodiments enable users to maintain or approach design intent, or to optimize their design based upon the shape of native (remaining) portion of the part before repair.

The measurement system 14 is used to measure a first set of points 16 on the outer surface of the native portion 44 of the component 12. The computer model 18 is registered to the measured first set of points 16 on the native portion 44 of the component 12. It should be noted herein that image registration may be referred to as a process of transforming different sets of data into one coordinate system. Registration is required in order to be able to compare or integrate the data obtained from different measurements. The computer model 18 is subjected to rigid body transformation and morphing according to the measured first set of points 16. As known to those skilled in the art, rigid body transformation may be referred to as a rigid body motion wherein an object may be moved from one position to another without altering the shape and size. Typical rigid body transformations involve translation, rotation, and reflection. Morphing may be referred to as a technique that changes (or morphs) one image into another through a seamless transition. The registering, rigid body transforming, and morphing are explained in greater detail with reference to subsequent flow charts. In the illustrated embodiment, the computer 20 initially determines the deviation between the first set of measurement points 16 on the native component portion 44 and the second set of points of the computer model 18. A rigid patch 48 and a warp patch 50 are identified based on the deviation between the first set of points 16 on the native component portion 44 and the second set of points of the computer model 18. Points 52 in the region away from the built-up or heated zone 46 (points taken in thicker areas of the part) are referred to as the rigid patch 48. Points 54 proximate to the built-up region 46 (thinner regions of the part) are referred to as the warp patch 50. The rigid patch 48 provides an estimate of the shape change as well as errors in positioning and orientation of the component 12. The warp patch 50 may change shape significantly due to heat and service. Defining relevant patches on the native component portion 44 and manipulating the patches in a sequence, enables the present technique to obtain a smooth shape and properly defined features.

Figure 3:
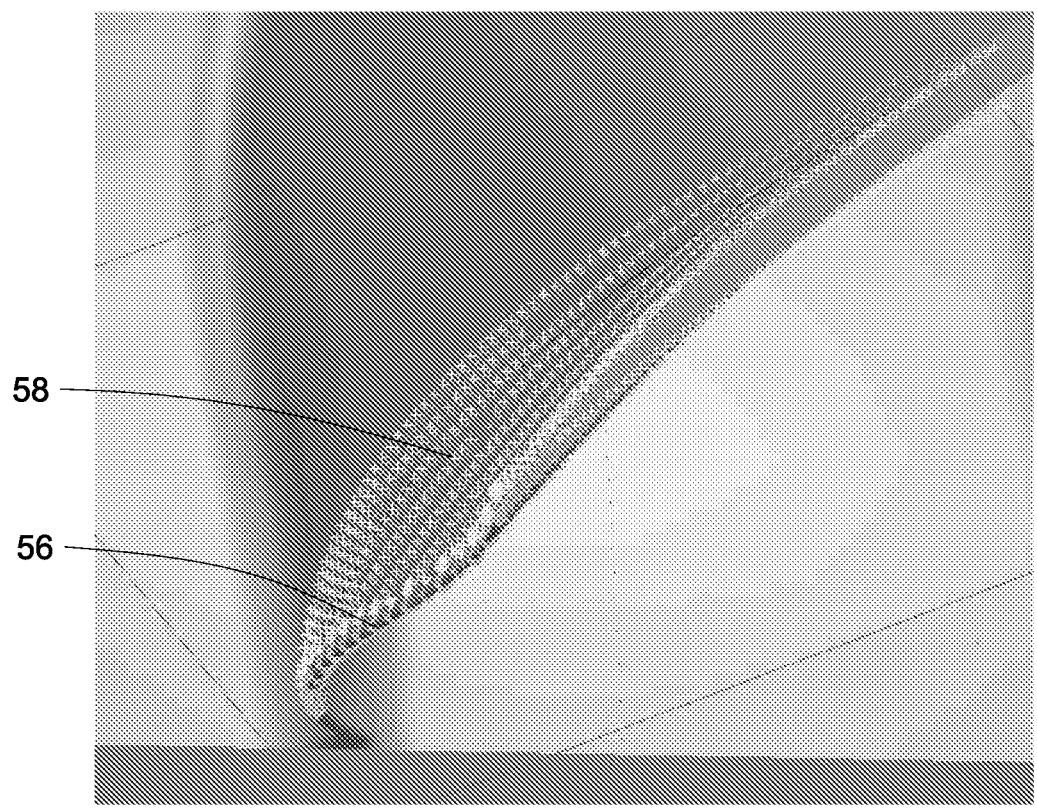
FIG. 3 is a diagrammatical representation of nominal cutter contact points and morphed cutter contact points generated by an adaptive machining system in accordance with an exemplary embodiment of the present technique.

Referring to FIG. 3, this figure is a diagrammatical representation of nominal cutter contact points 56 and morphed cutter contact points 58 generated by the machining system in accordance with an exemplary embodiment of the present technique. In the illustrated embodiment, to define the final geometry to be machined from the built-up region of the component 12, the computer system 20 creates a set of virtual points in a built-up region 46 of the transformed computer model. The built-up region 46 of the transformed model corresponds with the built-up or replacement portion of the component 12. These virtual points may be manipulated for purposes of matching original design intent or creating new optimized shapes at the point of repair or manufacture. The nominal tool path 36 is registered to the set of virtual points on the transformed computer model. The nominal tool path 36 is then subjected to rigid body transformation and morphing according to the set of virtual points so as to match the nominal cutter contact points 56 of the nominal tool path 36 with the set of virtual points of the transformed computer model to form the plurality of morphed or deformed cutter contact points 58. The plurality of deformed cutter contact points 58 form a deformed tool path. The registering, rigid body, transforming, and morphing are explained in greater detail with reference to subsequent flow charts. In some exemplary embodiments, the nominal cutter contact points 56 may be offset from the set of virtual points of the transformed computer model to form the deformed cutter points 58 of the deformed tool path so as to matching design intent or creating new optimized shapes at the point of repair or manufacture. In some embodiments, the original design including geometry and/or dimensions of the component 12 may be adjusted based on actual measurements of the native component portion.

Figure 4:
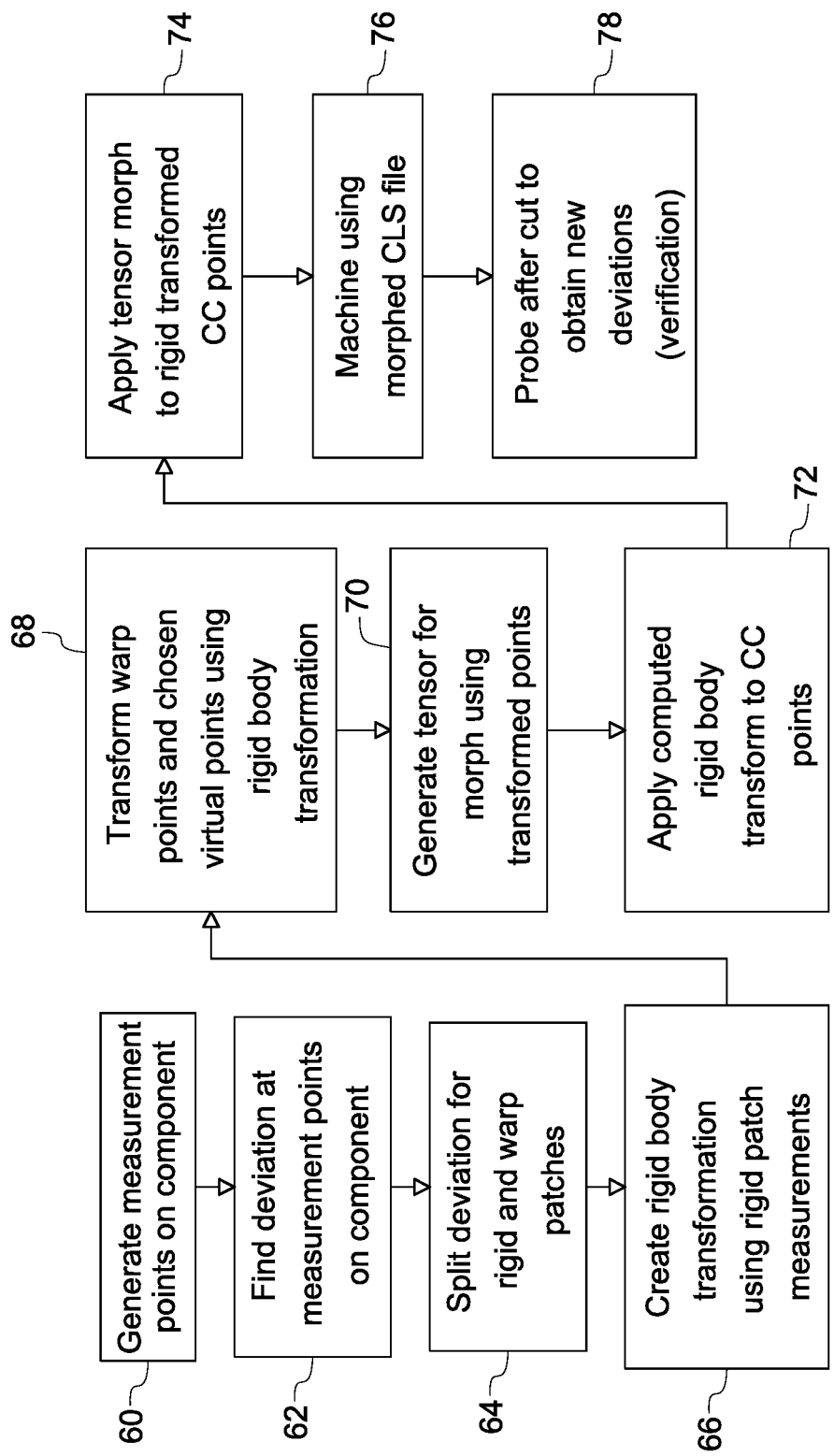
FIG. 4 is a diagrammatical representation of a flow chart illustrating exemplary steps involved in adaptive machining in accordance with an exemplary embodiment of the present technique.

Referring to FIG. 4, this figure is a flow chart illustrating one exemplary embodiment of steps involved in adaptive machining. In the illustrated embodiment, the measurement system 14 generates a first set of measurement points 16 on the native component portion as represented by the step 60. The computer 20 receives the first set of measurement points 16 from the measurement system 14 and the computer model 18 of the component. The computer 20 then determines the deviation between the first set of measurement points 16 on the native portion and the second set of points of the computer model 18 as represented by the step 62. The computer 20 classifies the first set of measurement points 16 on the component 12 into rigid patch 48 and warp patch 50 as represented by the step 64. The rigid patch 48 and warp patch 50 are identified based on the deviation between the first set of points 16 on the native portion and the second set of points of the computer model 18.

The computer model 18 is then registered to the first set of measurement points 16. The computer model 18 is subjected to rigid body transformation and morphing according to the rigid patch 48 as represented by the step 66. The method further includes creating a set of corresponding points to drive morphing. In other words, each of the measured points 16 on the native portion 44 (in both rigid and warp patches 48 and 50) is matched with the closest point on the registered (transformed) computer model 18 as represented by step 70. Transforming the computer model 18 in the warp patch 48 includes creating a set of virtual points in the transformed model that are adjustable to achieve original design intent, new optimized design, or a combination thereof. The registering and rigid body transformation details are described in the subsequent paragraph.

In the illustrated embodiment, the computer 20 obtains a series of n (x, y, z) points measured on the native component portion 44. The computer 20 then generates a series of n pairings between the computer model 18 (X, Y, Z) points and the n series of measured (x, y, z) points 16 on the native component portion 44. Each of the n pairings between the computer model 18 and the measured series of n points 16 substantially correspond to each other. After generating the series of n pairings between the computer model 18 points and the measured points 16 on the native component portion 44, the computer 20 determines a plurality of mapping functions for mapping point locations from the computer model 18 to approximate measured locations of points on the native component portion 44. Mathematical functions such as polynomial functions, trigonometric functions or logical functions may be used as the mapping functions. The computer 20 optimizes the mapping functions to minimize the distance between the point locations of the computer model 18 to the measured locations of points 16 on the native component portion 44. Suitable mathematical functions may be used as the optimization function. After optimizing the mapping functions, the computer 20 then transforms the point locations from the computer model 18 to the measured locations of points 16 on the native component portion 44. In particular, the optimized functions act as basis functions to transform the computer model coordinates and vectors to reflect the deformations measured in the native component portion 44. The transformation enables the original set of computer model 18 points to reside on or substantially near the actual measured points 16. The computer 20 generates a tensor for morph using the transformed computer model points as represented by the step 70. A tensor may be referred to as a generalized linear 'quantity' or 'geometrical entity' that can be expressed as a multi-dimensional array relative to a choice of basis of a particular space on which it is defined.

Rigid body transformation is applied to cutter contact (CC) points of the nominal tool path 36 as represented by the step 72. In other words, after transforming the computer model 18 according to the native component portion 44, the computer 20 modifies the nominal tool paths 36 to the measured coordinate system of the native component portion 44 according to the transformed computer model. The nominal tool paths 36 include a plurality of points and vectors in the nominal model coordinate system. After obtaining the nominal tool paths 36, the computer 20 then obtains the optimized mapping functions. The computer 20 applies the optimized mapping functions to the nominal tool paths 36. The nominal tool path 36 is registered to the set of virtual points created on the transformed computer model. In particular, for each point and vector that includes the nominal tool paths 36, the mapping functions move the tool path into an appropriate orientation and position with respect to the transformed model. After applying the optimized mapping functions to the nominal tool paths 36, the computer 20 generates the deformed tool paths. The tensor for morph is generated according to the deformed cutter contact points 58 of the deformed tool path 38 as represented by the step 74. As discussed previously, in some exemplary embodiments, the nominal cutter contact points 56 may be offset from the set of virtual points of the transformed computer model to form the deformed cutter points 58 of the deformed tool path 38 for the purpose of matching original design intent or creating new optimized shapes at the point of repair or manufacture. The modification of the nominal tool paths 36 results in the deformed tool paths 38, that the controller 40 uses to control a particular machining/manufacturing process. The controller 40 then uses the deformed tool paths 38 to machine the component 12 according to the original deign intent, new optimized design, or a combination thereof. After machining, the measurement points 16 on the machined component 12 may again be matched with the points on the computer model 18 to check for any deviations for verification purpose as represented by step 78. The exemplary technique disclosed herein may be used in a variety of numerical control processes such as drilling, milling, turning, inspecting, forging, non-contact measurement systems, surface finishing systems, or the like.

Figure 5:
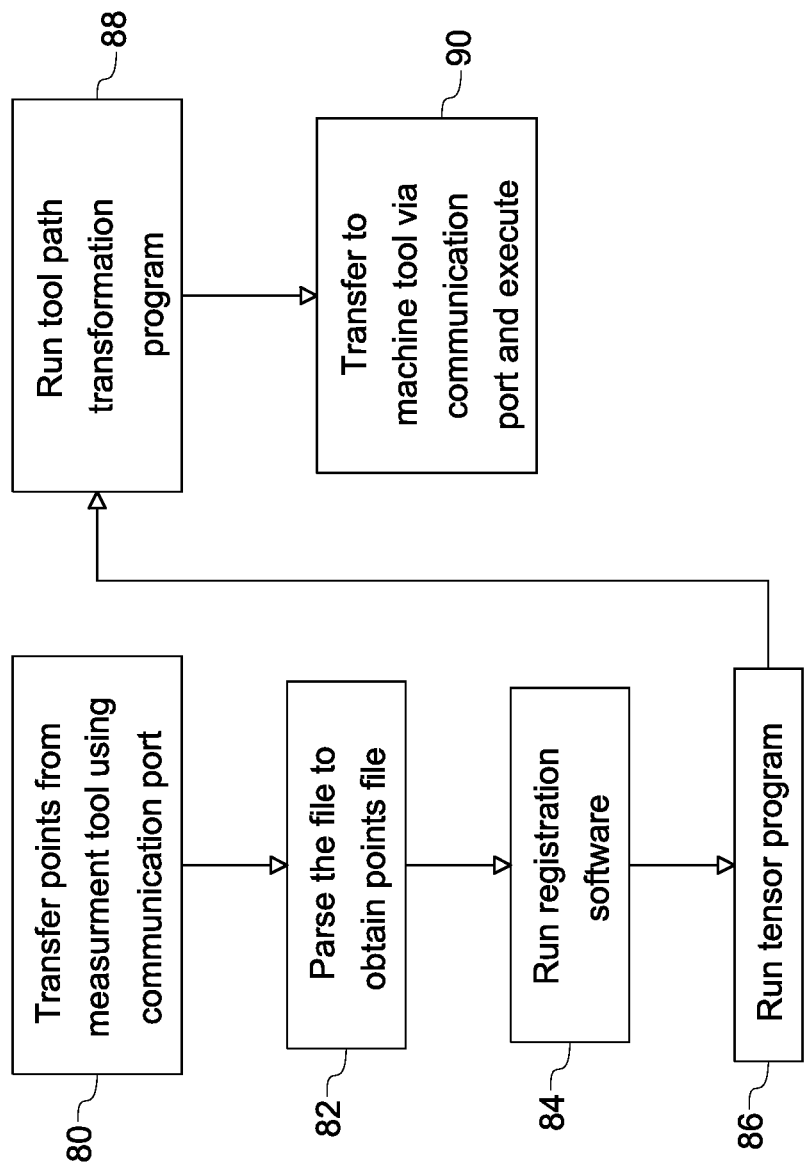
FIG. 5 is a diagrammatical representation of a flow chart illustrating exemplary steps involved in adaptive machining using computer software (e.g., code stored on a tangible medium such as memory) in accordance with an exemplary embodiment of the present technique.

Referring to FIG. 5, this figure is a flow chart illustrating one exemplary embodiment of steps involved in adaptive machining using computer software (e.g., code stored on a tangible medium such as memory). In the illustrated embodiment, a first set of measurement points 16 on a native component portion 44 is measured using a measurement tool. A computer 20 receives the first set of measurement points 16 from the measurement tool via a communication port as represented by the step 80. The computer 20 also receives a computer model 18 of the component 12 via the communication port. The computer 20 is then used to parse the points data to obtain a points file as represented by the step 82. In other words, the computer 20 determines the deviation between the first set of measurement points 16 on the native portion 44 and the second set of points of the computer model 18. The computer 20 classifies the first set of measurement points 16 on the component 12 into rigid patch 48 and warp patch 50.

The computer 20 then runs a registration software program as represented by the step 84. The computer model 18 is registered to the first set of measurement points 16. The computer model 18 is subjected to rigid body transformation according to the rigid patch 48. The method further includes creating a set of corresponding points to drive morphing. In other words, each of the measured points on the native portion 44 (in both rigid and warp patches 48 and 50) is matched with the closest point on the registered (transformed) computer model 18. The computer 20 then runs a tensor program as represented by the step 86. The computer 20 generates a tensor for morph using the transformed computer model points.

After transforming the computer model 18 according to the native component portion 44, the computer 20 then runs a tool path transformation program as represented by the step 88. The computer 20 modifies the nominal tool paths 36 to the measured coordinate system of the native component portion 44 according to the transformed computer model 18. After applying the optimized appropriate mapping functions to the nominal tool paths 36, the computer 20 generates the deformed tool paths 38. The tensor for morph is generated according to the deformed cutter contact points 58 of the deformed tool path 38. The deformed tool path 38 is then communicated to a machine tool via a communication port for machining the component 12 as represented by the step 90.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of repair, comprising:
removing a deformed portion of a component to define a native component portion;
measuring actual points on the native component portion in a first measuring step;
adding a replacement portion to the native component portion;
measuring actual points on the native component portion in a second measuring step and subsequent to inclusion of the replacement portion to determine deviations in measurement of points obtained in the first measuring step;
identifying a rigid patch and a warp patch on the native component portion based on deviations between actual measurements on the native component portion and a computer model;
adding points in the warp patch to obtain smooth transitions;
registering the computer model of the component to a fraction of the actual points on the native component portion;
altering the computer model based on the actual points and the original design intent to generate a transformation model;
modifying a nominal tool path according to the transformation model to generate a deformed tool path; and
adaptively machining the replacement portion utilizing the deformed tool path and according to original design parameters of the component.

2. The method of claim 1, wherein adaptively machining comprises machining the deformed portion on an airfoil at least generally consistent with an original airfoil design despite warping and/or damage to the airfoil as evident by measurements taken on the native component portion of the airfoil.

3. The method of claim 1, comprising adjusting an original design, including geometry and/or dimensions, based on actual measurements of the native component portion while maintaining design intent.

4. The method of claim 1, wherein the one or more original design parameters comprise a geometric model of the component.

5. The method of claim 1, comprising performing a single pass machining or a multi-pass machining of the replacement portion.

* * * * *